(12) United States Patent
Hoffmann (10) Patent No.: US 8,165,297 B2
(45) Date of Patent: Apr. 24, 2012

(54) TRANSCEIVER WITH CONTROLLER FOR AUTHENTICATION

(75) Inventor: Alexander Hoffmann, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 1264 days.

(21) Appl. No.: 10/718,753

(22) Filed: Nov. 21, 2003

(65) Prior Publication Data

US 2005/0113068 A1      May 26, 2005

(51) Int. Cl.
*H04L 29/06* (2006.01)
(52) U.S. Cl. ................................. 380/256; 713/155
(58) Field of Classification Search ............ 380/255, 380/256, 258, 277–279, 282; 713/150, 155, 713/156, 158, 168–173, 175, 176; 455/73, 455/411, 410
See application file for complete search history.

(56) References Cited

U.S. PATENT DOCUMENTS

| | | | |
|---|---|---|---|
| 4,799,061 A | 1/1989 | Abraham et al. | |
| 4,896,319 A | 1/1990 | Lidinsky et al. | |
| 4,905,301 A * | 2/1990 | Krolopp et al. | 455/434 |
| 5,122,893 A | 6/1992 | Tolbert | |
| 5,386,468 A | 1/1995 | Akiyama et al. | |
| 5,909,491 A * | 6/1999 | Luo | 380/270 |
| 6,028,937 A | 2/2000 | Tatebayashi et al. | |
| 6,052,604 A * | 4/2000 | Bishop et al. | 455/558 |
| 6,058,476 A | 5/2000 | Matsuzaki et al. | |
| 6,128,389 A * | 10/2000 | Chan et al. | 380/247 |
| 6,223,042 B1 * | 4/2001 | Raffel | 455/455 |
| 6,240,517 B1 | 5/2001 | Nishioka | |
| 6,253,322 B1 * | 6/2001 | Susaki et al. | 713/170 |
| 6,362,869 B1 | 3/2002 | Silverbrook | |
| 6,370,249 B1 * | 4/2002 | Van Oorschot | 380/277 |
| 6,371,354 B2 | 4/2002 | Blohmann et al. | |
| 6,374,354 B1 | 4/2002 | Walmsley et al. | |
| 6,442,525 B1 | 8/2002 | Silverbrook et al. | |
| 6,493,825 B1 | 12/2002 | Blumenau et al. | |
| 6,760,752 B1 * | 7/2004 | Liu et al. | 709/206 |
| 6,938,166 B1 * | 8/2005 | Sarfati et al. | 382/116 |
| 7,042,406 B2 * | 5/2006 | McFarland et al. | 343/703 |
| 7,149,430 B2 * | 12/2006 | Hosking et al. | 398/137 |
| 7,197,298 B2 * | 3/2007 | Azuma | 455/411 |
| 7,356,357 B2 * | 4/2008 | DeCost et al. | 455/566 |
| 7,450,719 B2 | 11/2008 | Lee et al. | |
| 7,580,988 B2 * | 8/2009 | Rudd | 709/217 |
| 7,657,740 B2 | 2/2010 | Numao et al. | |
| 7,697,691 B2 | 4/2010 | Sutton et al. | |
| 7,724,907 B2 | 5/2010 | Candelore | |

(Continued)

FOREIGN PATENT DOCUMENTS

EP              0898397 A2       2/1999

(Continued)

OTHER PUBLICATIONS

European Search Report EP 04 09 0443 mailed Apr. 6, 2005 (3 pgs).

(Continued)

*Primary Examiner* — Gilberto Barron, Jr.
*Assistant Examiner* — Abdulhakim Nobahar
(74) *Attorney, Agent, or Firm* — Maschoff Gilmore & Israelsen (57) ABSTRACT

A transceiver comprises a transmitter configured to transmit data signals, a receiver configured to receive data signals, and a controller configured to encrypt a string and supply the encrypted string to authenticate the transceiver.

32 Claims, 4 Drawing Sheets

U.S. PATENT DOCUMENTS

| | | | |
|---|---|---|---|
| 7,747,541 B2 | 6/2010 | Walmsley et al. | |
| 7,823,214 B2 | 10/2010 | Rubinstein et al. | |
| 7,845,016 B2 | 11/2010 | Diab et al. | |
| 2001/0037467 A1* | 11/2001 | O'Toole et al. | 713/201 |
| 2001/0052850 A1* | 12/2001 | Zimmerman | 340/572.1 |
| 2002/0018458 A1* | 2/2002 | Aiello et al. | 370/348 |
| 2002/0136169 A1* | 9/2002 | Struhsaker et al. | 370/280 |
| 2002/0137472 A1* | 9/2002 | Quinn et al. | 455/90 |
| 2002/0164026 A1* | 11/2002 | Huima | 380/247 |
| 2002/0170960 A1* | 11/2002 | Ehrensvard et al. | 235/380 |
| 2003/0021418 A1* | 1/2003 | Arakawa et al. | 380/277 |
| 2003/0072059 A1 | 4/2003 | Thomas et al. | |
| 2003/0108199 A1* | 6/2003 | Pinder et al. | 380/200 |
| 2003/0113118 A1 | 6/2003 | Bartur | |
| 2003/0128411 A1 | 7/2003 | Aronson et al. | |
| 2003/0159036 A1 | 8/2003 | Walmsley et al. | |
| 2003/0172268 A1 | 9/2003 | Walmsley et al. | |
| 2003/0188175 A1* | 10/2003 | Volk et al. | 713/191 |
| 2004/0052377 A1* | 3/2004 | Mattox et al. | 380/277 |
| 2004/0064699 A1* | 4/2004 | Hooker et al. | 713/170 |
| 2004/0081079 A1* | 4/2004 | Forest et al. | 370/216 |
| 2004/0177369 A1* | 9/2004 | Akins, III | 725/31 |
| 2004/0249817 A1* | 12/2004 | Liu et al. | 707/9 |
| 2005/0085193 A1* | 4/2005 | Stromberg et al. | 455/68 |
| 2005/0113068 A1 | 5/2005 | Hoffmann | |
| 2005/0113069 A1 | 5/2005 | Knauerhase et al. | |
| 2005/0203582 A1 | 9/2005 | Healy et al. | |
| 2006/0117181 A1 | 6/2006 | Brickell | |
| 2006/0232376 A1* | 10/2006 | Blaker | 340/5.22 |
| 2007/0083491 A1 | 4/2007 | Walmsley et al. | |
| 2007/0092258 A1 | 4/2007 | Nelson | |
| 2007/0130254 A1* | 6/2007 | Russ et al. | 709/203 |
| 2007/0177879 A1 | 8/2007 | Hsieh | |
| 2007/0192599 A1 | 8/2007 | Kato et al. | |
| 2008/0267408 A1 | 10/2008 | Hsieh | |
| 2009/0100502 A1 | 4/2009 | Li | |
| 2009/0240945 A1 | 9/2009 | Aronson | |
| 2010/0005301 A1* | 1/2010 | Asano et al. | 713/171 |

FOREIGN PATENT DOCUMENTS

EP    898397 A2 *    2/1999

OTHER PUBLICATIONS

A. Menezes et al.; Handbook of Applied Cryptography; pp. 397-398; 403-405; 548-549; 559-560 (9 pgs.); (1997).
200410095201.0, Apr. 11, 2008, Office Action (China).
04090443.5, Mar. 20, 2006, Office Action (EPO).
U.S. Appl. No. 11/739,539, Jun. 10, 2010, Office Action.
U.S. Appl. No. 11/739,539, Nov. 30, 2010, Office Action.
U.S. Appl. No. 12/251,139, Mar. 9, 2011, Office Action.
U.S. Appl. No. 12/264,194, Sep. 28, 2010, Office Action.
Menezes, et al., *Handbook of Applied Cryptography*, Chapter 1, CRC Press, 1996 (48 pages).
U.S. Appl. No. 12/251,139, Sep. 6, 2011, Office Action.
U.S. Appl. No. 12/264,194, Apr. 27, 2011, Office Action.
Office Action dated Jul. 8, 2011 as received in U.S. Appl. No. 11/739,539.

\* cited by examiner

TRANSCEIVER WITH CONTROLLER FOR AUTHENTICATION

BACKGROUND

Fiber optic transceivers are used in a variety of applications, including storage area networks (SANs), local area networks (LANs), Fibre Channel, Gigabit Ethernet, and SONET applications. Fiber optic transceivers can be used as the network interface in mainframe computers, workstations, servers, and storage devices. Fiber optic transceivers can also be used in a broad range of network devices, such as bridges, routers, hubs, and local and wide area switches.

Fiber optic transceivers include a fiber optic receiver and a fiber optic transmitter. The fiber optic receiver converts optical serial data to electrical serial data and the fiber optic transmitter converts electrical serial data to optical serial data. A majority of fiber optic transceivers include power control circuits, diagnostic circuits, and other circuits for enhancing the functionality of the fiber optic transceivers.

Fiber optic transceivers are typically critical components in a network system. If a fiber optic transceiver fails during operation of the network system, the entire network system can fail. Network system failure can result in disruptions of services and lost revenues. Because of the critical nature of fiber optic transceivers, some users of fiber optic transceivers require the manufacturers or suppliers of the fiber optic transceivers to indemnify the user for any losses incurred as a result of a failure of a fiber optic transceiver. In response to this potential liability, manufacturers and suppliers have developed strict quality standards that must be met before their fiber optic transceivers are certified for use in systems.

A typical problem for users, manufacturers, and suppliers of fiber optic transceivers is the gray market. Sometimes cloned fiber optic transceivers are used in place of original certified fiber optic transceivers after the original certified fiber optic transceivers reach their end of life or when additional fiber optic transceivers are being added to expand a system. The use of cloned fiber optic transceivers can negatively affect the user and the manufacturer and supplier of the authentic fiber optic transceivers.

The user is harmed because the cloned fiber optic transceivers are of unknown quality and have not been certified as meeting specified quality standards. When the user installs a cloned fiber optic transceiver in a system, the warranty on the system may be invalidated. The manufacturer and supplier of the authentic fiber optic transceiver may not service or support the cloned fiber optic transceiver. In addition, if the cloned fiber optic transceiver should fail, the manufacturer or supplier of the authentic certified fiber optic transceiver will not assume liability for the failure. The customer would be required to attempt to recover from the manufacturer or supplier of the cloned fiber optic transceiver.

Cloned fiber optic transceivers harm the manufacturers and suppliers of authentic certified fiber optic transceivers due to loss of market share, loss of reputation, and liability issues. The reputation of a manufacturer or supplier for quality can be harmed if users believe a cloned fiber optic transceiver originated with the manufacturer or supplier of authentic certified fiber optic transceivers. Liability, warranty, service, and support issues are likely to arise between the user and the manufacturer or supplier when cloned fiber optic transceivers are used in place of authentic certified fiber optic transceivers.

SUMMARY

One embodiment of the present invention provides a transceiver. The transceiver comprises a transmitter configured to transmit data signals, a receiver configured to receive data signals, and a controller configured to encrypt a string and supply the encrypted string to authenticate the transceiver.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
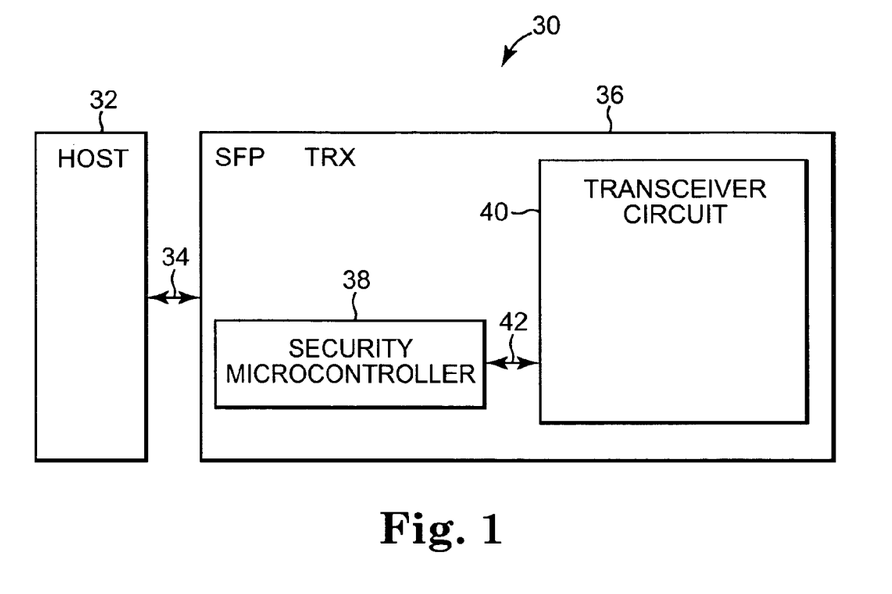
FIG. 1 is a block diagram illustrating one embodiment of a portion of a network system.

FIG. 1 is a block diagram illustrating one embodiment of a portion of a network system 30. Network system 30 includes a host 32 and a transceiver 36. Host 32 is electrically coupled to transceiver 36 through communication link 34. Transceiver 36 includes a security microcontroller 38 and a transceiver circuit 40. Security microcontroller 38 is electrically coupled to transceiver circuit 40 through path 42. In one embodiment, transceiver 36 is a small form factor pluggable (SFP) transceiver (TRX).

Host 32 is a mainframe computer, workstation, server, storage device, or network device such as a bridge, router, hub, or local or wide area switch. In other embodiments, host 32 is any suitable device that communicates with other devices through a transceiver.

Transceiver 36 includes a housing for installing transceiver 36 in network system 30. In one embodiment, transceiver 36 is compatible with RJ-45 style backpanels for high-end data communications and telecommunications applications and provides the advantages of fiber optic technology. In other embodiments, transceiver 36 is designed for low cost storage area networks (SANs), local area networks (LANs), Fibre Channel, Gigabit Ethernet, and SONET applications. Transceiver 36 can be used as the network interface in mainframe computers, workstations, servers, and storage devices, and in a broad range of network devices, such as bridges, routers, hubs, and local and wide area switches.

Security microcontroller 38 is built into transceiver 36 and disposed on a printed circuit board (PCB) that is not visible from the outside of transceiver 36. Security microcontroller 38 is configured to identify transceiver 36 to host 32. Security microcontroller 38 communicates to host 32 that transceiver 36 is an authentic transceiver and not a clone or copy. An authentic transceiver is a transceiver that has been certified by the manufacturer or supplier of the transceiver as meeting specified quality standards. This prevents a transceiver, such as transceiver 36, from being cloned and sold in the gray market.

Transceiver circuit 40 includes a receiver and a transmitter. The receiver converts optical serial data received from an external device into electrical serial data to pass to host 32. The transmitter converts electrical serial data received from host 32 into optical serial data to pass to an external device. Transceiver circuit 40 is used to transmit and receive data between host 32 and other devices.

Upon installation of transceiver 36, host 32 communicates with security microcontroller 38 through communication link 34 to determine if transceiver 36 is authentic. If transceiver 36 is not authentic, transceiver 36 is rejected and does not function with host 32. If transceiver 36 is accepted, transceiver 36 functions with host 32. Once transceiver 36 is authenticated and accepted, host 32 uses transceiver 36 to transmit and receive data.

Figure 2:
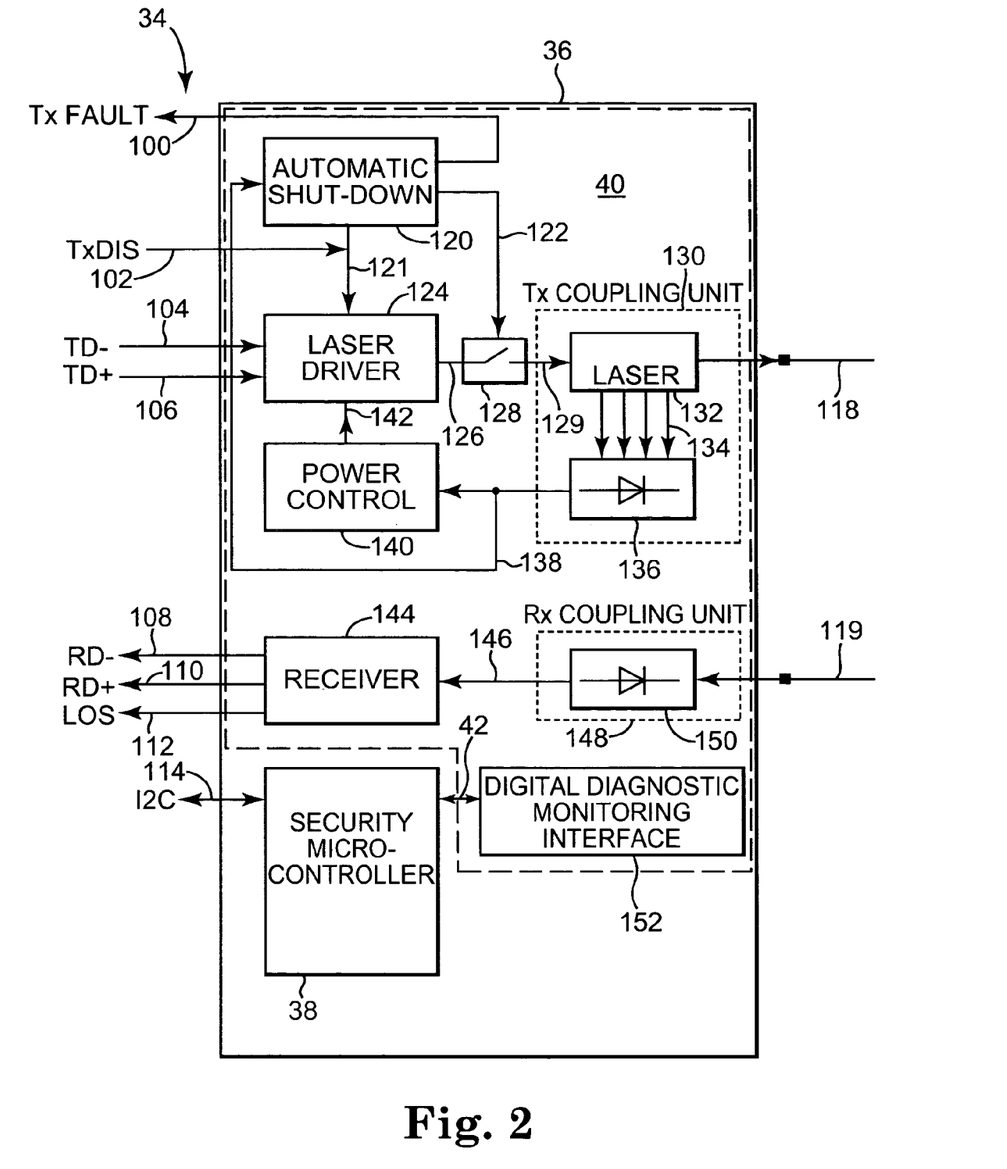
FIG. 2 is a block diagram illustrating one embodiment of a transceiver having a security microcontroller.

FIG. 2 is a block diagram illustrating one embodiment of transceiver 36. Transceiver 36 includes security microcontroller 38, transceiver circuit 40, and communication link 34. Transceiver circuit 40 includes an automatic shutdown circuit 120, a laser driver 124, a switch 128, a transmitter (Tx) coupling unit 130, a power control circuit 140, a receiver 144, a receiver (Rx) coupling unit 148, and a digital diagnostic monitoring interface 152. The Rx coupling unit 148 includes a photodiode 150. The Tx coupling unit 130 includes a laser diode 132 and a monitor diode 136.

The automatic shutdown circuit 120, laser driver 124, switch 128, Tx coupling unit 130, and power control circuit 140 are configured as a transmitter. Automatic shutdown circuit 120 is electrically coupled to laser driver 124 through path 121 and to switch 128 through path 122. Laser driver 124 is electrically coupled to switch 128 through path 126 and to power control circuit 140 through path 142. Switch 128 is electrically coupled to laser diode 132 through path 129 and laser diode 132 is optically coupled to monitor diode 136 through optical path 134. Monitor diode 136 is electrically coupled to power control circuit 140 and automatic shut down circuit 120 through path 138. Tx coupling unit 130 is coupled to fiber optic cable 118.

The receiver 144 and Rx coupling unit 148 are configured as a receiver. Receiver 144 is electrically coupled to photodiode 150 through path 146. Rx coupling unit 148 is coupled to a fiber optic cable 119. Digital diagnostic monitoring interface 152 is electrically coupled to security microcontroller 38 through path 42.

Communication link 34 includes a transmitter fault (Tx Fault) signal line 100, a transmitter disable (TxDis) signal line 102, a transmit data minus (TD−) signal line 104, and a transmit data plus (TD+) signal line 106. In addition, communication link 34 includes a receive data minus (RD−) signal line 108, a receive data plus (RD+) signal line 110, loss of signal (LOS) line 112, and an inter-integrated circuit (I2C) bus 114. In other embodiments, I2C bus 114 can be replaced with another suitable communication bus.

Transmitter fault signal line 100 is electrically coupled to automatic shutdown circuit 120. Transmitter disable signal line 102 is electrically coupled to automatic shutdown circuit 120 and laser driver 124 through path 121. Transmit data minus signal line 104 and transmit data plus signal line 106 are electrically coupled to laser driver 124. Receive data minus signal line 108, receive data plus signal line 110, and loss of signal line 112 are electrically coupled to receiver 144, and inter-integrated circuit bus 114 is electrically coupled to security microcontroller 38.

Rx coupling unit 148 mechanically and optically couples transceiver 36 to fiber optic cable 119. An optical signal transmitted by an external device is received by photodiode 150 and converted by photodiode 150 to an electrical signal. The electrical signal is passed to receiver 144 through path 146.

Receiver 144 converts the signal received from photodiode 150 into electrical serial data compatible with low voltage positive emitter coupled compatible logic (LVPECL). The LVPECL compatible electrical serial data is passed to host 32 through signal lines RD− 108 and RD+ 110. The loss of signal on LOS signal line 112 indicates whether an optical signal is present at Rx coupling unit 148.

Monitoring diode 136 monitors the optical output of laser diode 132 through optical path 134. In one embodiment, monitoring diode 136 is mechanically built into Tx coupling unit 130. Monitoring diode 136 outputs a signal indicative of the output of laser diode 132 through path 138 to automatic shutdown circuit 120 and power control circuit 140.

Laser driver circuit 124 drives the modulation and bias current of laser diode 132. The currents are controlled by power control circuit 140 to provide constant output power of laser diode 132 over varying temperatures and as the laser diode 132 ages. Power control circuit 140 uses the output of monitor diode 136 as a control signal to prevent the laser power from exceeding operating limits.

Tx coupling unit 130 mechanically and optically couples transceiver 36 to fiber optic cable 118. Laser driver 124 receives a LVPECL compatible serial data signal from host 32 through TD− signal line 104 and TD+ signal line 106 and passes the signal to laser diode 132. Laser diode 132 converts the signal received from laser driver 124 into optical serial data and transmits the optical serial data through fiber optic cable 118.

Shutdown circuit 120 automatically disables laser diode 132 and outputs a fault signal on Tx Fault signal line 100 if shutdown circuit 120 detects a laser fault. By disabling laser diode 132, shutdown circuit 120 provides laser eye safety. Shutdown circuit 120 communicates with switch 128 through path 122 to open or close switch 128 to disable or enable laser diode 132.

In one embodiment, transceiver 36 includes a supervisory circuit for controlling the power supply. The supervisory circuit provides an internal reset signal whenever the supply voltage drops below a reset threshold. In one embodiment, the supervisory circuit keeps the reset signal active for at least 140 ms after the voltage has risen above the reset threshold. During this time, laser diode 132 is inactive.

Host 32 can enable the laser driver 124 by providing a logic low level on TxDis signal line 102. Host 32 can disable the laser driver 124 by providing a logic high level on TxDis signal line 102.

Digital diagnostic monitoring interface 152 continuously monitors transceiver 36 operating parameters. In one embodiment, transceiver 36 features internal calibration. Measurements are taken and transceiver 36 is calibrated over varying operating temperatures and voltages to obtain normal operating parameter ranges for transceiver 36. During operation, digital diagnostic monitoring interface 152 generates diagnostic data that is compared to the normal operating parameter ranges by digitizing internal analog signals monitored by a diagnostic integrated circuit (IC). The diagnostic IC has built in sensors that include alarm and warning thresholds. The threshold values are set during device manufacture and allow the user to determine when a particular value is outside of a normal operating parameter range.

Digital diagnostic monitoring interface 152 outputs alarm and warning flags to security microcontroller 38 through path 42. Security microcontroller 38 passes the alarm and warning flags to host 32 through I2C bus 114. Alarm flags indicate conditions likely to be associated with an inoperational link that requires immediate action. Warning flags indicate conditions outside normal operating ranges, but not necessarily causes of immediate link failures.

I2C bus 114 allows host 32 and security microcontroller 38 to communicate directly with each other over two active wires and a ground connection. Both host 32 and security microcontroller 38 can act as transmitters and receivers on the I2C bus. Host 32 is the bus master if host 32 initiates a data transfer to security microcontroller 38 and security microcontroller 38 is the bus slave for the data transfer. Security microcontroller 38 is the bus master if security microcontroller 38 initiates a data transfer to host 32 and host 32 is the bus slave for the data transfer.

Figure 3:
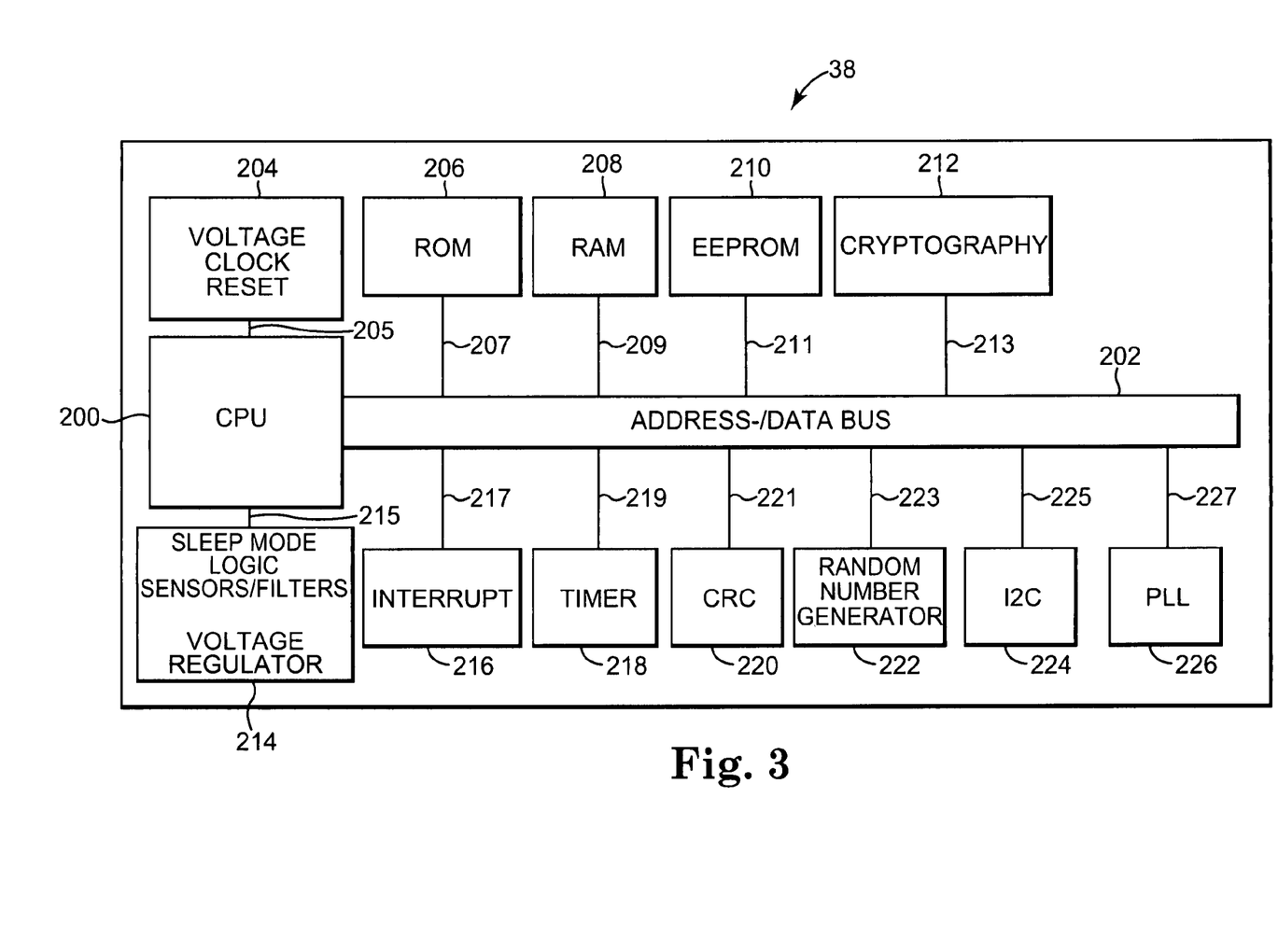
FIG. 3 is a block diagram illustrating one embodiment of a security microcontroller.

FIG. 3 is a block diagram illustrating one embodiment of security microcontroller 38. In one embodiment, security microcontroller 38 is a single semiconductor chip. Security microcontroller 38 includes a voltage clock reset module 204, a read only memory (ROM) 206, a random access memory (RAM) 208, an electrically erasable and programmable read only memory (EEPROM) 210, a cryptography module 212, a central processing unit (CPU) 200, sleep mode logic sensors/filters and voltage regulator module 214, an interrupt module 216, a timer module 218, a cyclic redundancy check (CRC) module 220, a random number generator 222, an inter-integrated circuit (I2C) receiver-transmitter 224, a phase-locked loop (PLL) module 226, and an address/data bus 202. In other embodiments, security microcontroller 38 does not include all of these components. Also, in other embodiments, I2C receiver-transmitter 224 can be replaced with another suitable receiver-transmitter.

CPU 200 is electrically coupled to address/data bus 202. ROM 206 is electrically coupled to address/data bus 202 through path 207 and RAM 208 is electrically coupled to address/data bus 202 through path 209. EEPROM 210 is electrically coupled to address/data bus 202 through path 211 and cryptography module 212 is electrically coupled to address/data bus 202 through path 213. Interrupt module 216 is electrically coupled to address/data bus 202 through path 217 and timer module 218 is electrically coupled to address/data bus 202 through path 219. CRC module 220 is electrically coupled to address/data bus 202 through path 221 and random number generator 222 is electrically coupled to address/data bus 202 through path 223. I2C receiver-transmitter 224 is electrically coupled to address/data bus 202 through path 225 and PLL module 226 is electrically coupled to address/data bus 202 through path 227. Sleep mode logic sensor filters and voltage regulator module 214 is electrically coupled to CPU 200 through path 215 and voltage clock reset module 204 is electrically coupled to CPU 200 through path 205.

CPU 200 controls the functioning of security microcontroller 38 and communicates with the other components of security microcontroller 38 directly or through address/data bus 202. ROM 206 stores operating system and application programs for security microcontroller 38. RAM 208 temporarily stores data and instructions for operating security microcontroller 38. EEPROM 210 stores operating parameters and other information relating to the operation of transceiver 36 and a public key/private key pair for authenticating security microcontroller 38. Cryptography module 212 performs encryption and decryption of communications between host 32 and security microcontroller 38. Random number generator 222 generates random numbers for use in cryptography module 212. I2C receiver-transmitter 224 transmits and receives communications from host 32.

Other components in security microcontroller 38 perform a variety of functions. Voltage clock reset module 204 resets the voltage and clock for security microcontroller 38. Sleep mode logic sensors/filters and voltage regulator module 214 regulates the voltage in security microcontroller 38 and enables sleep mode for saving power in security microcontroller 38. Interrupt module 216 allows external circuits to initiate actions in security microcontroller 38. Timer module 218 is used for timing operations in security microcontroller 38. CRC module 220 performs cyclic redundancy checks on data passing to security microcontroller 38. PLL 226 synchronizes a clock in security microcontroller 38 with an external clock.

Security microcontroller 38 authenticates transceiver 36 with host 32 upon installation of transceiver 36. At the original equipment manufacturer (OEM), each security microcontroller 38 is assigned a unique transceiver 36 specific public key/private key pair. The transceiver 36 specific public key is sealed (encrypted) using a private key that belongs to and is known only to the issuing authority for security microcontroller 38. The issuing authority is typically the OEM customer for whom security microcontroller 38 is manufactured. The transceiver 36 specific private key and sealed transceiver 36 specific public key are loaded into security microcontroller 38 in a private storage area, such as an area in EEPROM 210, where they are not directly accessible from outside security microcontroller 38. In one embodiment, a global access code is associated with the transceiver 36 specific public key/private key pair for greater security.

Upon installation of transceiver 36 in system 30, host 32 attempts to authenticate transceiver 36. Host 32 sends a message to security microcontroller 38 requesting the sealed transceiver 36 specific public key of security microcontroller 38. If a global access code has been associated with the transceiver 36 specific public key/private key pair, the request message includes the access code.

Security microcontroller 38 checks the global access code, if called for, and returns the sealed transceiver 36 specific public key associated with that access code. The sealed transceiver 36 specific public key serves as a certificate identification (ID) for security microcontroller 38.

Host 32 unseals (decrypts) the sealed transceiver 36 specific public key using the known corresponding public key of the issuing authority. Host 32 completes the authentication of transceiver 36 by generating a random number and passing the random number to security microcontroller 38. Security microcontroller 38 seals (encrypts) the random number using the transceiver 36 specific private key. In one embodiment, host 32 generates an authentication string in place of the random number for authentication. After security microcontroller 38 returns the result to host 32, host 32 uses the transceiver 36 specific public key obtained from the previously requested sealed transceiver 36 specific public key to decrypt the result. If the decrypted result matches the random number that host 32 generated, security microcontroller 38 contains the unique transceiver 36 specific private key associated with the transceiver 36 specific public key that was sealed by the issuing authority. Host 32 concludes that security microcontroller 38, and by extension transceiver 36 in which it is mounted, is authentic. If host 32 determines that transceiver 36 is authentic, host 32 accepts and uses transceiver 36. If, however, host 32 determines that transceiver 36 is not authentic, host 32 rejects and does not use transceiver 36.

The public key cryptography system used to authenticate security microcontroller 38 can be any public key system that provides suitable encryption. The authentication application is self-contained, and does not involve existing infrastructure that limits its choice of encryption system. In one embodiment, RSA is the cryptography method used to authenticate security microcontroller 38. In another embodiment, elliptic curve cryptography (ECC) is used to authenticate security microcontroller 38. ECC has an advantage over RSA in that a shorter key length is required for suitable security compared to systems based on RSA.

Other embodiments of the authentication protocol can be used that can provide a somewhat higher level of security at modest cost. In one embodiment, multiple unique transceiver 36 specific public key/private key pairs are generated and stored in each security microcontroller 38. Each key pair is associated with a different access code. Each of the transceiver specific public keys of the set of key pairs is sealed using a different private key from the issuing authority. The host system software is written to use one of the key pairs. A later revision or patch to the software, however, can switch to one of the other stored key pairs by changing the access code used. This provides a recovery strategy in case a transceiver specific public key/private key pair in use in one of the security microcontrollers is somehow discovered and used to create cloned security microcontrollers that can pass authentication. Since the new key pair has not been used prior to the new software release, it is not vulnerable to discovery by cryptographic attack or by differential power analysis. The availability of an additional sealed transceiver specific public key, unused and inaccessible until a new system software release exposes the access code, also provides a fallback in the event that the issuing authority's first private key is somehow cracked.

Figure 4:
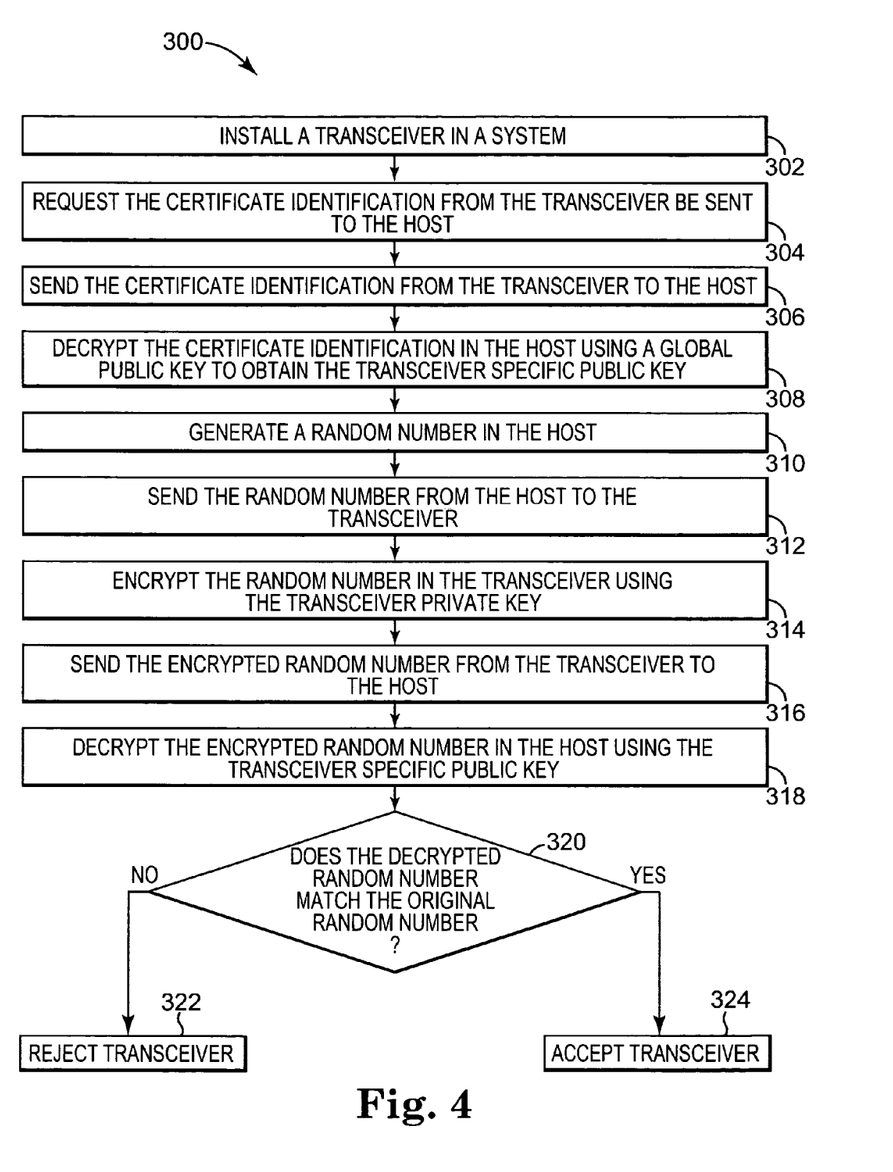
FIG. 4 is a flow diagram illustrating one embodiment of a method for authenticating a transceiver.

FIG. 4 is a flow diagram illustrating one embodiment of a method for authenticating a transceiver 36 including a security microcontroller 38 encoded with a transceiver 36 specific public key/private key pair. At 302, transceiver 36 is installed in a system 30. At 304, host 32 requests the certificate identification (encrypted transceiver 36 specific public key) from transceiver 36 be sent to host 32. At 306, transceiver 36 sends the certificate identification to host 32 from security microcontroller 38 through I2C bus 114. At 308, host 32 decrypts the certificate identification using a public key of the issuing authority and obtains the transceiver 36 specific public key. At 310, host 32 generates a random number. At 312, host 32 sends the random number to security microcontroller 38. At 314, security microcontroller 38 encrypts the original random number using the transceiver 36 specific private key.

At 316, security microcontroller 38 sends the encrypted random number to host 32. At 318, host 32 decrypts the encrypted random number using the transceiver 36 specific public key. At 320, host 32 determines if the decrypted random number matches the original random number. If the decrypted random number matches the original random number, transceiver 36 is authentic and is accepted at 324. If the decrypted random number does not match the original random number, transceiver 36 is not authentic and is rejected at 322.

What is claimed is:

1. A transceiver comprising:
   an electrical interface configured to receive outgoing data signals from a host coupled to the transceiver and transmit incoming data signals to the host;
   a fiber optic transmitter configured to transmit the outgoing data signals received from the host via the electrical interface;
   a fiber optic receiver configured to receive the incoming data signals from an external device over a network communications channel; and
   a controller configured to encrypt a string and supply the encrypted string to the host via the electrical interface to authenticate the transceiver,
   authentication of the transceiver being contingent upon whether or not the transceiver has been certified as meeting a specified quality standard;
   wherein the controller comprises:
   a data bus; a central processing unit (CPU) coupled to the data bus;
   a voltage clock reset module and sleep mode logic sensors/ filters and voltage regulator module coupled to the CPU;
   a read only memory (ROM), a random access memory (RAM), an electrically erasable and programmable read only memory (EEPROM) and a cryptography module coupled to the data bus; and
   an interrupt module, a timer module, a cyclic redundancy check (CRC) module, a random number generator, an inter-integrated circuit (I2C) receiver-transmitter, and a phase-locked loop (PLL) coupled to the data bus.

2. The transceiver of claim 1, wherein the controller is configured to encrypt the string with a transceiver private encryption key.

3. The transceiver of claim 1, wherein the controller is configured to use a transceiver private encryption key and a transceiver public encryption key to authenticate the transceiver.

4. The transceiver of claim 3, wherein the controller is configured to encrypt the string with the transceiver private encryption key.

5. The transceiver of claim 3, wherein the transceiver public encryption key is sealed by encrypting the transceiver public encryption key with a system private encryption key and stored as a sealed transceiver public encryption key.

6. The transceiver of claim 5, wherein the sealed transceiver public encryption key is decrypted with a system public encryption key to retrieve the transceiver public encryption key.

7. The transceiver of claim 1, wherein the controller comprises an electrically erasable and programmable read only memory that is used to store a transceiver private encryption key and a transceiver public encryption key.

8. The transceiver of claim 1, wherein the cryptography module is configured to encrypt the string.

9. The transceiver of claim 1, wherein the controller comprises an RSA encryption module for encrypting the string.

10. The transceiver of claim 1, wherein the transceiver comprises a small form factor pluggable transceiver.

11. The transceiver of claim 1, wherein if the transceiver is authentic, the transceiver cannot be cloned.

12. A network system comprising:
    a host;
    an interface electrically coupled to the host; and
    a transceiver comprising:
    a transmitter configured to transmit data signals;
    a receiver configured to receive data signals; and
    a controller configured to encrypt a string and to communicate the encrypted string to the host through the interface to authenticate the transceiver with the host, authentication of the transceiver being contingent upon whether or not the transceiver has been certified as meeting a specified quality standard,
    wherein the controller is configured to encrypt the string using a host-selectable one of a plurality of transceiver private encryption keys stored in the transceiver:
    wherein the controller comprises:
    a data bus;
    a central processing unit (CPU) coupled to the data bus;
    a read only memory (ROM), a random access memory (RAM), an electrically erasable and programmable read only memory (EEPROM) and a cryptography module coupled to the data bus;
    a voltage clock reset module and sleep mode logic sensors/ filters and voltage regulator module coupled to the CPU; and
    an interrupt module, a timer module, a cyclic redundancy check (CRC) module, a random number generator, an inter-integrated circuit (I2C) receiver-transmitter, and a phase-locked loop (PLL) coupled to the data bus.

13. The network system of claim 12, wherein the interface comprises an inter-integrated circuit bus.

14. The network system of claim 12, wherein the interface comprises a transceiver fault status line.

15. The network system of claim 12, wherein the interface comprises a transceiver disable line.

16. The network system of claim 12, wherein the interface comprises a transmit data in line TD+ and an inverted transmit data in line TD−.

17. The network system of claim 12, wherein the interface comprises a received data out line RD+ and an inverted received data out line RD−.

18. The network system of claim 12, wherein the interface comprises a loss of signal status line.

19. The network system of claim 12, wherein the host is one of a mainframe computer, a workstation, a server, and a storage device.

20. The network system of claim 12, wherein the host is one of a bridge, a router, a hub, a local area switch and a wide area switch.

21. A transceiver comprising:
a transmitter configured and arranged to transmit data signals to an external device over a network connection in response to commands from a local host;
a receiver configured and arranged to receive data signals from the external device over the network connection and to pass corresponding data signals to the local host; and
a controller in communication with the transmitter and the receiver and configured and arranged to communicate with the local host over a local communication link to authenticate the transceiver with the local host,
wherein:
the controller stores a first unique transceiver-specific public key/private key pair for authentication,
the first unique transceiver-specific public key/private key corresponds with a manufacturer of the transceiver,
the first unique transceiver-specific public key/private key pair is selectable by the local host from a plurality of transceiver-specific public key/private key pairs stored on the transceiver, and
the controller comprises:
a data bus;
a central processing unit (CPU) coupled to the data bus;
a voltage clock reset module and sleep mode logic sensors/filters and voltage regulator module coupled to the CPU;
a read only memory (ROM), a random access memory (RAM), an electrically erasable and programmable read only memory (EEPROM) and a cryptography module coupled to the data bus; and
an interrupt module, a timer module, a cyclic redundancy check (CRC) module, a random number generator, an inter-integrated circuit (I2C) receiver-transmitter, and a phase-locked loop (PLL) coupled to the data bus.

22. The transceiver of claim 21, wherein the first unique transceiver-specific public key/private key pair is associated with a first access code and the controller stores a second unique transceiver-specific public key/private key pair for authentication, wherein the second unique transceiver-specific public key/private key pair is associated with a second access code.

23. The transceiver of claim 22, wherein the first unique transceiver-specific public key/private key pair is used for authentication in response to the host communicating the first access code to the controller and the second unique transceiver-specific public key/private key pair is used for authentication in response to the host communicating the second access code to the controller.

24. A fiber optic transceiver comprising:
a transmitter configured to transmit data signals to an external device over a network communications channel, the transmitted data signals being representative of data received from a local host;
a receiver configured to receive data signals from the network communications channel and transmitting corresponding signals representative of the received data signals to the local host;
a controller configured to authenticate the fiber optic transceiver to the local host upon installation of the fiber optic transceiver without using the network communications channel, the controller enabling the host to determine whether or not the fiber optic transceiver is a cloned transceiver; and
a plurality of local host-selectable transceiver private encryption keys stored in the fiber optic transceiver;
wherein the controller comprises:
a data bus;
a central processing unit (CPU) coupled to the data bus;
a data storage device coupled to the data bus, wherein the data storage device comprises a read only memory (ROM), a random access memory (RAM), and an electrically erasable and programmable read only memory (EEPROM);
a cryptography module coupled to the data bus;
a voltage clock reset module and sleep mode logic sensors/filters and voltage regulator module coupled to the CPU; and
an interrupt module, a timer module, a cyclic redundancy check (CRC) module, a random number generator, an inter-integrated circuit (I2C) receiver-transmitter, and a phase-locked loop (PLL) coupled to the data bus.

25. The fiber optic transceiver of claim 24, wherein the means for receiving data signals comprises means for converting optical serial data into electrical serial data.

26. The fiber optic transceiver of claim 24, wherein the means for transmitting data signals comprises means for converting electrical serial data into optical serial data.

27. The fiber optic transceiver of claim 24, wherein the controller is further configured to encrypt an authentication string using a local host-selected transceiver specific private key, the encrypted authentication string configured to be decrypted using a transceiver specific public key.

28. A method for authenticating a transceiver in a system comprising:
installing a transceiver in the system so that the transceiver is in communication with a local host;
receiving, at the transceiver, a selection by the local host of one of a plurality of transceiver private encryption keys stored in the transceiver;
sending an authentication signal from the transceiver to the local host, the authentication signal including an encrypted transceiver public encryption key corresponding to the host-selected one of the plurality of transceiver private encryption keys, the encrypted transceiver public encryption key being encrypted with a public key of an issuing authority;
analyzing the authentication signal in the local host by decrypting the authentication signal using the public key of the issuing authority to obtain, at the host, the transceiver public encryption key;
generating an authentication string in the local host;

sending the authentication string from the lost host to the transceiver;
encrypting, at the transceiver, the authentication string using the host-selected one of the plurality of transceiver private encryption keys;
sending the encrypted authentication string from the transceiver to the local host;
decrypting the encrypted authentication string at the local host using the transceiver public encryption key to generate a decrypted authentication string;
determining whether the transceiver is authenticate by comparing the authentication string generated in the local host to the decrypted authentication string; and
selecting, at the local host, one of accepting and rejecting the transceiver based upon the determination, wherein:
the local host accepts the transceiver and uses the accepted transceiver for data communications with a remote external device over a network connection if the transceiver is determined by the local host to be authentic; and
the local host rejects the transceiver for data communications with the remote external device if the transceiver is determined by the local host to be inauthentic.

29. A method for authenticating a transceiver, comprising:
plugging a transceiver into a corresponding receptacle of a local host to electrically couple the transceiver to the local host through a communication link, the transceiver comprising a plurality of transceiver specific public key/private key pairs and each of the transceiver specific public keys being encrypted with a different one of a plurality of private keys of an issuing authority;
requesting, by the local host, a particular one of the encrypted transceiver specific public keys from the transceiver;
passing the particular one of the encrypted transceiver specific public keys from the transceiver to the local host by way of the communication link; and
decrypting the particular one of the encrypted transceiver specific public keys in the local host using a corresponding public key of the issuing authority to obtain a particular transceiver specific public key;
wherein the transceiver comprises a controller, and
wherein the controller comprises:
a data bus;
a central processing unit (CPU) coupled to the data bus;
a voltage clock reset module and sleep mode logic sensors/filters and voltage regulator module coupled to the CPU;
a read only memory (ROM), a random access memory (RAM), an electrically erasable and programmable read only memory (EEPROM) and a cryptography module coupled to the data bus; and
an interrupt module, a timer module, a cyclic redundancy check (CRC) module, a random number generator, an inter-integrated circuit (I2C) receiver-transmitter, and a phase-locked loop (PLL) coupled to the data bus.

30. The method of claim 29 comprising:
generating an original authentication string in the local host;
sending the original authentication string from the local host to the transceiver;
encrypting the original authentication string in the transceiver using the transceiver specific private key corresponding to the particular transceiver specific public key;
passing the encrypted authentication string from the transceiver to the local host; and
decrypting the encrypted authentication string in the local host using the particular transceiver specific public key.

31. The method of claim 30 comprising:
comparing the decrypted authentication string to the original authentication string; and
selecting one of rejecting and accepting the transceiver based upon the comparison.

32. The method of claim 30, wherein the original authentication string is a random number.

* * * * *